(12) United States Patent
Metzger et al.

(10) Patent No.: US 12,525,098 B2
(45) Date of Patent: *Jan. 13, 2026

(54) DIGITAL DATA OBJECT SYSTEM FOR ONLINE GAMING

(71) Applicant: Lotto.com Inc., Jersey City, NJ (US)

(72) Inventors: Thomas Metzger, Millbrook, NY (US); Arthur Mirzoian, Bayonne, NJ (US)

(73) Assignee: Lotto.com Inc., Jersey City, NJ (US)

( * ) Notice: Subject to any disclaimer, the term of this patent is extended or adjusted under 35 U.S.C. 154(b) by 289 days.

This patent is subject to a terminal disclaimer.

(21) Appl. No.: 18/303,618

(22) Filed: Apr. 20, 2023

(65) Prior Publication Data

US 2023/0343186 A1    Oct. 26, 2023

Related U.S. Application Data

(60) Provisional application No. 63/363,434, filed on Apr. 22, 2022.

(51) Int. Cl.
  *G07F 17/32*   (2006.01)
  *G06F 3/0488*  (2022.01)
  *G06Q 20/32*   (2012.01)

(52) U.S. Cl.
  CPC .......... *G07F 17/329* (2013.01); *G06F 3/0488* (2013.01); *G06Q 20/32* (2013.01)

(58) Field of Classification Search
  CPC .. G07F 17/329; G07F 17/3225; G06F 3/0488; G06Q 20/32; G06Q 20/12; G06Q 50/34
  USPC .......................................................... 463/17
  See application file for complete search history.

(56) References Cited

U.S. PATENT DOCUMENTS

| | | | |
|---|---|---|---|
| 7,780,522 B2* | 8/2010 | Lutnick | G06Q 20/327 463/25 |
| 9,339,121 B2 | 5/2016 | Siciliano et al. | |
| 11,278,789 B1 | 3/2022 | Patel et al. | |
| 11,446,563 B1 | 9/2022 | Patel et al. | |
| 11,465,037 B1 | 10/2022 | Patel et al. | |
| 11,547,928 B1 | 1/2023 | Patel et al. | |
| 11,554,313 B1 | 1/2023 | Patel et al. | |
| 11,554,314 B1 | 1/2023 | Patel et al. | |
| 12,090,412 B2 | 9/2024 | Patel et al. | |
| 12,145,076 B2 | 11/2024 | Patel et al. | |

(Continued)

FOREIGN PATENT DOCUMENTS

| | | |
|---|---|---|
| WO | 2021017224 | 2/2021 |
| WO | 2023009670 | 2/2023 |

*Primary Examiner* — Pierre E Elisca
(74) *Attorney, Agent, or Firm* — DLA Piper LLP (US)

(57) ABSTRACT

A computing system receives a request to create a digital data object from a user device of a user for use in a game. The computing system generates the digital data object based on the request. The computing system causes a physical data object corresponding to the digital data object to be activated. The computing system receives a plurality of scanned images of the physical data object. The computing system receives an indication of an outcome of the game based on the physical data object. Based on the indication and the plurality of scanned images, the computing system generates a set of graphical objects to be displayed to the user via the user device of the user. The computing system causes the user to participate in the game using the set of graphical objects.

20 Claims, 18 Drawing Sheets

(56) References Cited

U.S. PATENT DOCUMENTS

| | | |
|---|---|---|
| 12,214,288 B2 | 2/2025 | Patel et al. |
| 12,337,246 B2 | 6/2025 | Patel et al. |
| 2008/0207296 A1* | 8/2008 | Lutnick ............... G07F 17/3255 463/16 |
| 2011/0059784 A1* | 3/2011 | Lutnick ............... G07F 17/3244 463/16 |
| 2012/0102666 A1 | 5/2012 | Sciuto |
| 2012/0129586 A1* | 5/2012 | Lutnick ............... G06Q 20/327 463/16 |
| 2014/0046481 A1 | 2/2014 | Siciliano et al. |
| 2016/0012465 A1* | 1/2016 | Sharp ................... G06Q 20/321 705/14.17 |
| 2016/0132740 A1* | 5/2016 | Wang .................. G06V 30/416 382/182 |
| 2016/0171784 A1 | 6/2016 | Chen et al. |
| 2017/0061736 A1* | 3/2017 | Lutnick ............... G07F 17/3237 |
| 2017/0132868 A9 | 5/2017 | Katz et al. |
| 2021/0133905 A1 | 5/2021 | Dekel |
| 2021/0252378 A1 | 8/2021 | Dekel |

* cited by examiner

REDHOT
Serial Number: xxx-xxx-xxx

Activate — Scan — Claim — Check

Select Prize Amount
Terminal shows you the winning prize amount

| No Prize | $50 | $1,000 |
| $10 | $100 | $10,000 |
| $20 | $200 | $50,000 |
| $30 | $500 (552) | $500,000 |

< Back          Continue >

DIGITAL DATA OBJECT SYSTEM FOR ONLINE GAMING

CROSS REFERENCE TO RELATED APPLICATION

The present application claims priority of U.S. Provisional Patent Application 63/363,434 filed on Apr. 22, 2022, the entire contents of which is incorporated herein for all purposes by this reference.

FIELD OF THE DISCLOSURE

Embodiments disclosed herein generally related to a system to generate a digital data object corresponding to a physical data object for participation in a lottery game online.

BACKGROUND

Online lottery ticket sales are a relatively nascent option for players in the United States. In the UK, by way of comparison, the digital channel represents over 40% of all National Lottery sales.

SUMMARY

In some embodiments, a method is disclosed herein. A computing system receives a request to create a digital data object from a user device of a user for use in a game. The computing system generates the digital data object based on the request. The computing system causes a physical data object corresponding to the digital data object to be activated. The computing system receives a plurality of scanned images of the physical data object. The plurality of scanned images includes a first set of scanned images of the physical data object in a first state and a second set of scanned images of the physical data object in a second state. The computing system receives an indication of an outcome of the game based on the physical data object. Based on the indication and the plurality of scanned images, the computing system generates a set of graphical objects to be displayed to the user via the user device of the user. The computing system causes the user to participate in the game using the set of graphical objects.

In some embodiments, a system is disclosed herein. The system includes a processor and a memory. The memory includes one or more sequences of instructions, which, when executed by the processor, causes the system to perform operations. The operations include receiving a request to create a digital data object from a user device of a user for use in a game. The operations further include generating the digital data object based on the request. The operations further include causing a physical data object corresponding to the digital data object to be activated. The operations further include receiving a plurality of scanned images of the physical data object. The plurality of scanned images includes a first set of scanned images of the physical data object in a first state and a second set of scanned images of the physical data object in a second state. The operations further include receiving an indication of an outcome of the game based on the physical data object. The operations further include, based on the indication and the plurality of scanned images, generating a set of graphical objects to be displayed to the user via the user device of the user. The operations further include causing the user to participate in the game using the set of graphical objects.

In some embodiments, a non-transitory computer readable medium is disclosed herein. The non-transitory computer readable medium includes one or more sequences of instructions, which, when executed by one or more processors, causes a computing system to perform operations. The operations include receiving, by the computing system, a request to create a digital data object from a user device of a user for use in a game. The operations further include generating, by the computing system, the digital data object based on the request. The operations further include causing, by the computing system, a physical data object corresponding to the digital data object to be activated. The operations further include receiving, by the computing system, a plurality of scanned images of the physical data object. The plurality of scanned images includes a first set of scanned images of the physical data object in a first state and a second set of scanned images of the physical data object in a second state. The operations further include receiving, by the computing system, an indication of an outcome of the game based on the physical data object. The operations further include, based on the indication and the plurality of scanned images, generating, by the computing system, a set of graphical objects to be displayed to the user via the user device of the user. The operations further include causing, by the computing system, the user to participate in the game using the set of graphical objects.

In some embodiments, a method is disclosed herein. The method includes steps of transmitting, by a user device of a user, a request to a computing system for a physical data object for use in a game and receiving, by the user device, a digital data object virtually representing the physical data object based on the request, the digital data object comprising a scanned image of the physical data object obscured by a virtual top layer. The method also includes steps of receiving, by the user device, instructions from the user to remove the virtual top layer from the digital data object, removing, by the user device, the virtual top layer from the digital data object, displaying, by the user device, the digital data object without the virtual top layer revealing results of the game, and indicating, by the user device, a prize of the game based on the revealed game results.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5C illustrates an exemplary graphical user interface, according to example embodiments.

FIG. 5D illustrates an exemplary graphical user interface, according to example embodiments.

To facilitate understanding, identical reference numerals have been used, where possible, to designate identical elements that are common to the figures. It is contemplated that elements disclosed in an embodiment may be beneficially utilized on other embodiments without specific recitation.

DETAILED DESCRIPTION

Embodiments disclosed herein generally relate to a system and method for generating a digital data object (i.e., graphical object) corresponding to a physical data object. With the ever increasing reliance on computers and mobile devices, companies have turned to digital platforms for delivering their offerings to end users. While most companies are able to perform this migration seamlessly, for other companies, such as those involved in state lotteries, the adoption of a digital platform is not as trivial. These companies typically have to satisfy the various guidelines and laws of their states in order to provide end users with some form of a digital or mobile experience. One of the more popular lottery games is what is referred to as a "scratch-off" lottery game. As those skilled in the art understand, a scratch-off lottery game is one in which a user scratches or otherwise removes a top layer of a scratch-off lottery ticket to reveal one or more letters, numbers, and symbols to determine if the user won a prize. Conventionally, entities involved in the sale or delivery of scratch-off lottery tickets are limited to only allowing end users to remotely purchase scratch-off tickets, which may then be physically mailed to the address of the user. As those skilled in the art understand, this places a burden on both the user and the state approved facility to physically deliver scratch-off tickets, and necessarily requires the recipient to return to the physical store in the event of a winning occurrence, thus reducing the number of interested parties participating in the game.

One or more techniques described herein eliminates this burden on potential participants by providing a means to satisfy the guidelines of the state. For example, one or more techniques described herein utilize digital data objects that are linked to physical data objects (e.g., official state lottery physical scratch-off tickets) for remote or online participation in the game.

The term "user" as used herein includes, for example, a person or entity that owns a computing device or wireless device; a person or entity that operates or utilizes a computing device or wireless device; or a person or entity that is otherwise associated with a computing device or wireless device. It is contemplated that the term "user" is not intended to be limiting and may include various examples beyond those described.

Figure 1:
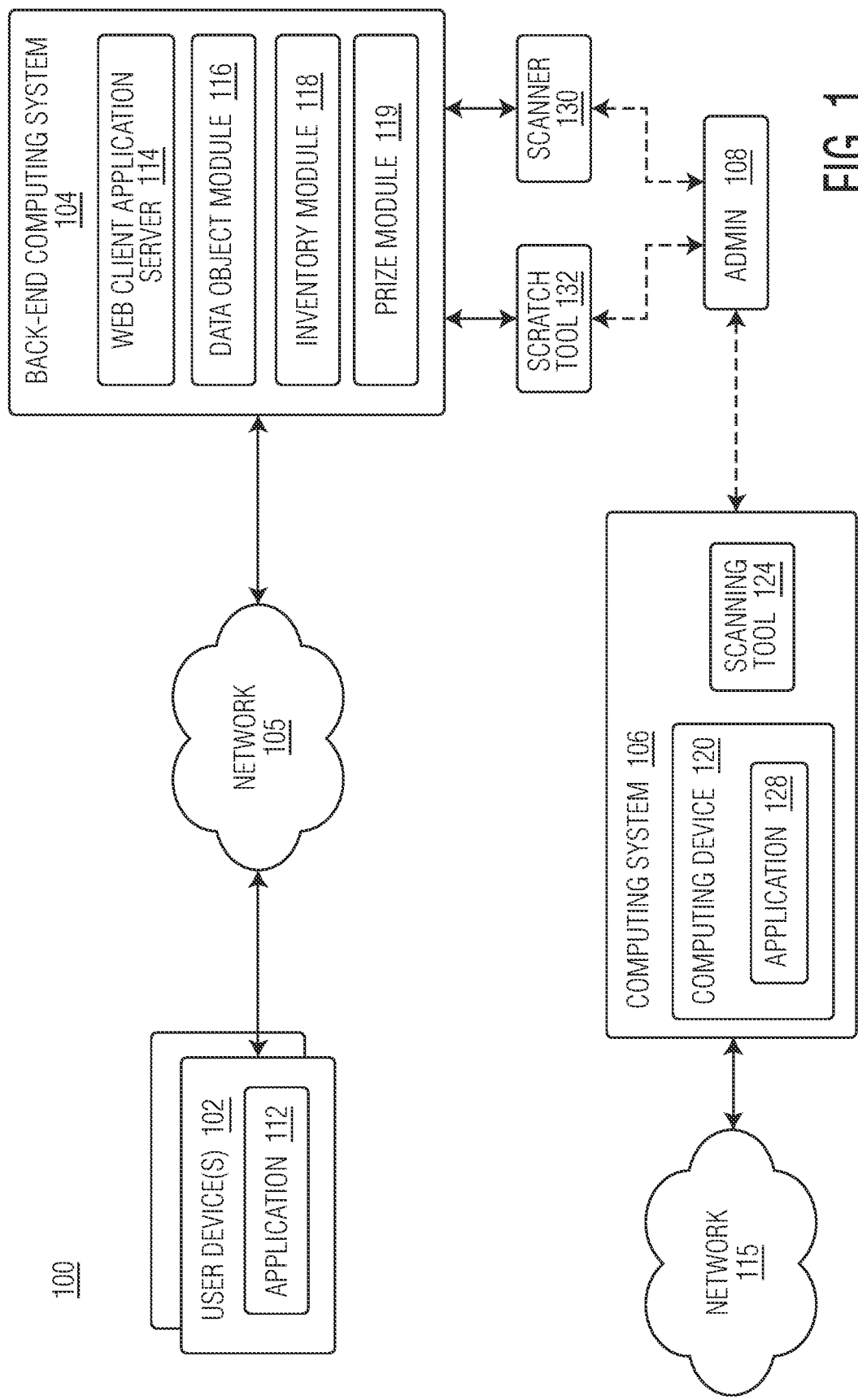
FIG. 1 is a block diagram illustrating a computing environment, according to example embodiments.

FIG. 1 is a block diagram illustrating computing environment 100, according to example embodiments. Computing environment 100 may include at least one or more user devices 102, a back-end computing system 104, and computing system 106. In some embodiments, one or more user devices 102 and back-end computing system 104 may communicate via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be the Internet, a private data network, virtual private network using a public network and/or other suitable connection(s) that enables components in computing environment 100 to send and receive information between the components of computing environment 100.

User device 102 may be operated by a user. In some embodiments, user device 102 may be operated by a user seeking to purchase a scratch-off lottery ticket from back-end computing system 104. User device 102 may be representative of a mobile device, a tablet, a desktop computer, or any computing system having the capabilities described herein. User device 102 may include at least application 112. Application 112 may be representative of an application associated with back-end computing system 104. In some embodiments, application 112 may be a standalone application associated with back-end computing system 104. In some embodiments, application 112 may be representative of a web-browser configured to communicate with back-end computing system 104. In some embodiments, user device 102 may communicate over network 105 to request a webpage, for example, from web client application server 114 of back-end computing system 104. For example, user device 102 may be configured to execute application 112 to participate in a game (e.g., participate in a scratch-off lottery ticket). The content that is displayed to user device 102 may be transmitted from web client application server 114 to user device 102, and subsequently processed by application 112 for display through a graphical user interface (GUI) of user device 102.

Back-end computing system 104 may include web client application server 114, data object module 116, inventory module 118, and prize module 119. Each of data object module 116, inventory module 118, and prize module 119 may be comprised of one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Data object module 116 may be configured to facilitate remote participation in what is traditionally a physical game by creating a digital data object (e.g., electronic version of a scratch-off ticket) that is linked to a physical object. The digital data object that may be presented to the user may correspond to a physical copy of the digital data object. For example, when a user requests a scratch-off game via application 112, traditionally, organizations may only be able to mail a live, physical scratch-off ticket to the user. Data object module 116 eliminates this time-consuming and less secure step by creating a digital data object that corresponds to a physical scratch-off ticket that the user can virtually "scratch" using user device 102.

As shown, an administrator 108 may monitor a queue of requests for online participation in a physical game. For a given request, administrator 108 may identify a physical version of the game (i.e., a physical scratch-off ticket that is authorized by a state lottery system) and may scan the front and back (e.g., frontside/backside) of the physical version of the game using scanner 130. Generally, a physical version of the game may include an identifier that uniquely identifies the physical version. For example, a physical scratch-off ticket may include an identifier (e.g., barcode) that uniquely identifies the physical scratch-off ticket. This identifier may be located on the front or back of the physical scratch-off ticket, and may or may not be obscured by a top layer.

Once scanned, data object module 116 may create a digital data object corresponding to the physical data object. In some embodiments, data object module 116 may create a digital data object that has the same or similar look-and-feel as the physical data object. In some examples, the digital data object may be the scanned version of the physical data object. In some examples, the digital data object may be the scanned version of the physical data object with some digital modifications (e.g., digital filtering to clean up and/or enhance/clarify features of the digital data object).

Following scanning, administrator 108 may cause the physical data object to change states. For example, administrator 108 may cause the physical data object to change states from an unscratched physical scratch-off ticket to a scratched physical scratch-off ticket. In some embodiments, administrator 108 may cause the physical data object to change states by physical scratching a top layer of the physical scratch-off ticket to reveal the outcome of the game. In some embodiments, administrator 108 may input the physical data object into a scratch tool 132, which can automatically remove a top layer from the physical scratch-off ticket.

Administrator 108 may then re-scan the front and back surfaces of the unveiled physical data object for upload to data object module 116. Once re-scanned, data object module 116 may be configured to create a digital version of the unveiled physical data object. For example, data object module 116 may identify the numbers, letters, and/or symbols that are revealed on the physical data object and may generate an "unveiled" digital data object corresponding thereto. Again, the unveiled digital data object may be the scanned version of the unveiled (e.g., scratched) physical data object, and in another example, the unveiled digital data object may be the scanned version of the unveiled physical data object with some digital modifications (e.g., digital filtering to clean up and/or enhance/clarify features of the unveiled digital data object).

Computing system 106 may be external to back-end computing system 104. For example, computing system 106 may be connected to private network 115. In some embodiments, computing system 106 may be managed by a state run entity or organization. For example, computing system 106 may be representative of a state approved vendor terminal for lottery ticket production.

Computing system 106 may include one or more of a computing device 120 and a scanning tool 124. Computing device 120 may include an application 128 executing thereon. Application 128 may be representative of an application for executing lottery terminal software associated with an organization or entity running a state's lottery.

In some embodiments, scanning tool 124 may be configured to scan a barcode or QR code that is revealed once a top layer is removed from the physical data object. Generally, the barcode that is hidden may reveal whether the user has received a prize. Accordingly, no computer vision or machine learning may be needed to analyze the revealed numbers, letters, or symbols to determine if a user has won.

Following confirmation that the printed physical copy of the digital data object is correct, the user can open the digital scratch ticket to reveal their prize. The user can virtually "scratch" the ticket using their finger/mouse, or click to "quick scratch" to immediately display the results. Data object module 116 may then provide the user with a confirmation email. The confirmation email may include a scanned image of the printed physical copy of the digital data object. Once scanned, computing device 120 may signal to administrator 108 whether the participant has received a prize (e.g., partial prize, full prize, etc.) and the prize amount. Administrator 108 may notify data object module 116 accordingly.

Inventory module 118 may be configured to maintain an inventory of available physical data objects. For example, upon receiving a stack or roll of physical data objects, an administrator may scan a barcode or identifier associated with the stack or roll of physical data objects. Based on the scanning, inventory module 118 may be configured to build a database or table of available physical data objects in the stack or roll of physical data objects.

In some embodiments, inventory module 118 may further update the database or table of available physical data objects in real-time or near real-time based on user demand. For example, when a first physical data object is selected, scanned, and associated with a user's request, inventory module 118 may update the database or table so that the physical data object is only assigned to a single user.

In some embodiments, inventory module 118 may further be configured to provide end users with a total of the available physical data objects. For example, if back-end computing system 104 offers three types of physical data objects, inventory module 118 may notify or update, in real-time or near real-time, the available inventory of each type of physical data object.

Prize module 119 may be configured to handle the awarding of prizes to users, based on the outcome of the game. In some embodiments, prize module 119 may be configured to automatically credit a user's account with a prize, if, for example, the prize is below a defined threshold amount (e.g., less than $600), at which point the user's account balance may be updated. In some embodiments, prize module 119 may instruct the user to visit a physical brick and mortar location to retrieve their prize, if, for example, the prize amount is at least a threshold amount (e.g., greater than $600). In some examples, the physical brick and mortar location may be lottery offices in the state where the physical ticket was purchased.

Figure 2:
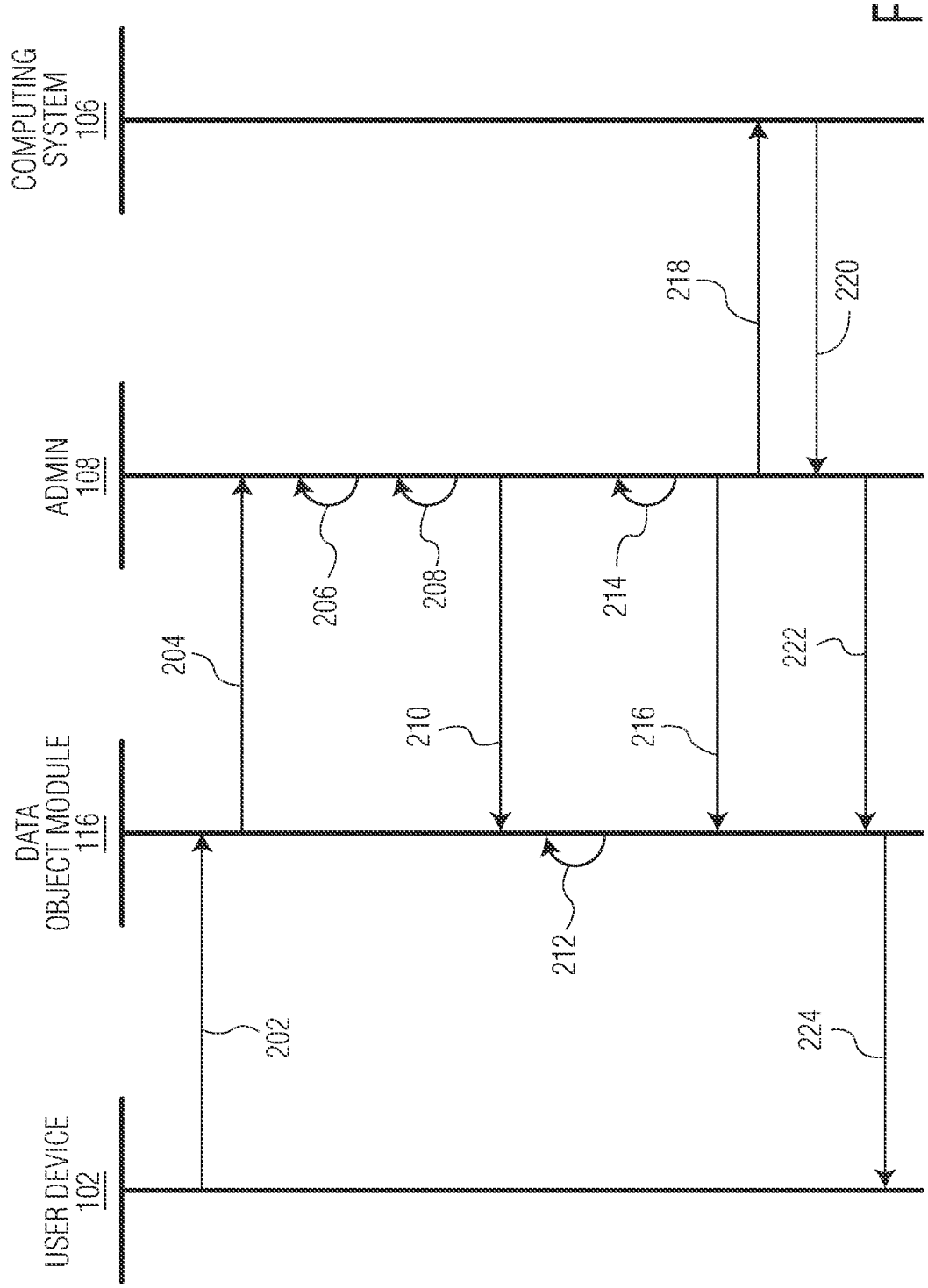
FIG. 2 is a block diagram illustrating an exemplary workflow, according to example embodiments.

FIG. 2 is a block diagram illustrating an exemplary workflow 200, according to example embodiments.

As shown, workflow 200 may begin at step 202. At step 202, a user of user device 102 may provide a request to back-end computing system 104. For example, a user of user device 102 may access application 112 to request participation in an online game that includes a digital data object and a physical data object. Using a specific example, a user may indicate to back-end computing system 104 that they may want to participate in a scratch-off game.

At step 204, data object module 116 may receive the call to initiate the online game based on the user request. Data object module 116 may forward the request to administrator 108 for process.

At step 206, administrator 108 may activate a physical data object. The physical data object may be a scratch-off lottery ticket. In some embodiments, activating a physical data object may include administrator 108 scanning the physical data object with scanning tool 124 of computing system 106.

At step 208, administrator 108 may scan a front surface and/or a back surface of the physical data object. For example, using scanner 130, administrator 108 may upload scanned images of the front surface and/or the back surface of the physical data object to back-end computing system 104. At step 210, administrator 108 may submit the scans to back-end computing system 104 for processing. Submitting the scans to back-end computing system 104 may link the physical data object to the user's account.

At step 212, data object module 116 may create a digital data object corresponding to the physical data object. For example, data object module 116 may create a digital version (i.e., electronic version) of the physical data object that is now linked to the user. In this manner, an interface with a digital representation of the physical data object may be presented to the user, such that the user can interact with the digital data object, similar to the manner in which they may interact with the physical data object.

At step 214, administrator 108 may remove a top layer of the physical data object. In some embodiments, removing the top layer of the physical data object may involve administrator 108 physically scratching off the top layer of the physical data object to reveal letters, numbers, and/or symbols underneath. In some embodiments, removing the top layer of the physical data object may involve the administrator using a scratch tool 132 to automatically remove the top layer of the physical data object. Once removed, administrator 108 may re-scan a front surface and/or a back surface of the physical data object. For example, using scanner 130, administrator 108 may upload scanned images of the front surface (with top layer removed) and/or the back surface of the physical data object to back-end computing system 104.

At step 216, administrator 108 may submit the scans to back-end computing system 104 for processing.

At step 218, administrator 108 may access computing system 106 to determine if the user has won a prize. For example, at step 218, administrator 108 may scan a barcode or QR code that was revealed following removal of the top layer with scanning tool 124 to determine whether the user won a prize. At step 220, computing system 106 may notify administrator 108 whether the user won a prize.

At step 222, following receipt of the prize notification from computing system 106, administrator 108 may notify data object module 116 of the outcome of the game. In some embodiments, the outcome of the game may be one of a win, a partial win, or a loss.

At step 224, data object module 116 may notify the user that they can participate in the game using their digital data object. For example, data object module 116 may generate a graphical representation of the physical data object that allows a user to virtually "scratch" a top layer of the digital data object to reveal letters, numbers, and/or symbols. In some examples, the graphical representation of the physical data object on user device 102 may be the scanned version of the unveiled physical data object with an overlay obscuring the scanned version. In other words, a virtual top layer may be added over the top of the scanned version of the unveiled physical data object. In some embodiments, data object module 116 may simply allow the user to interface with a button that may reveal whether the user won or lost the game. Data object module 116 may then notify the user of the game's outcome.

Figure 3:
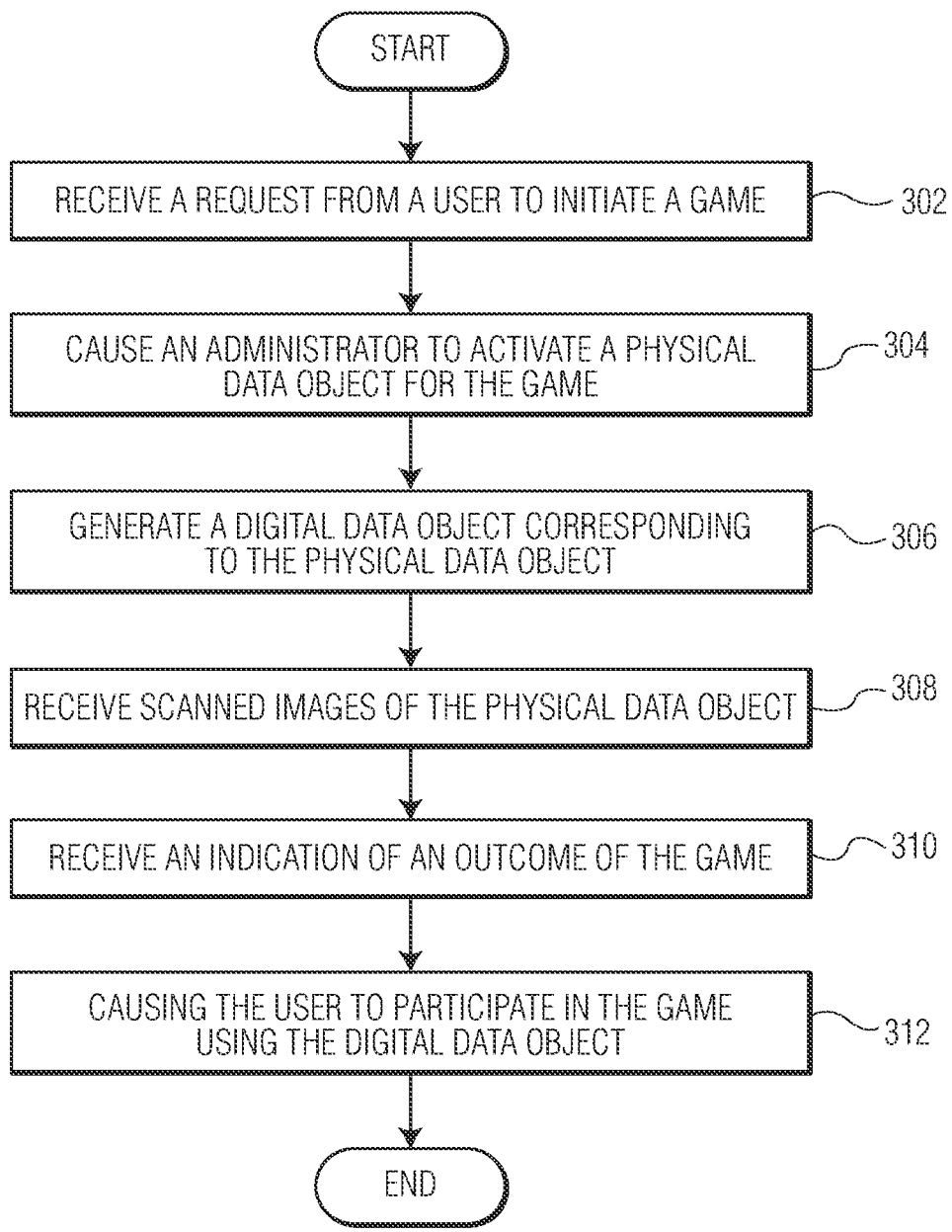
FIG. 3 is a flow diagram illustrating a method of executing a workflow, according to example embodiments.

FIG. 3 is a flow diagram illustrating a method 300 of executing a workflow, according to example embodiments. Method 300 may begin at step 302.

At step 302, back-end computing system 104 may receive a request from a user to initiate a game. For example, data object module 116 may receive a request from the user to participate in a scratch-off game, commercially offered by a state-run lottery system. In some embodiments, data object module 116 may reserve the game until checkout is complete or the cart is abandoned.

At step 304, back-end computing system 104 may cause an administrator to activate a physical data object for the game. For example, data object module 116 may notify the administrator that the user may want to participate in the game. Based on the notification, the administrator may activate a physical data object. The physical data object may be a scratch-off lottery ticket.

In some embodiments, activating the physical data object may cause inventory module 118 to update the inventory of available physical data objects to purchase.

In some embodiments, back-end computing system 104 may also provide the user with the serial number corresponding to the activated physical data object. For example, data object module 116 may initiate an email to the user with the serial number of the physical data object.

At step 306, back-end computing system 104 may generate a digital data object corresponding to the physical data object. For example, data object module 116 may generate a digital data record that corresponds to the physical scratch-off ticket assigned to the user by the administrator.

At step 308, back-end computing system 104 may receive scanned images of the physical data object. For example, data object module 116 may receive two sets of images: a first set of images of the physical data object in which the top layer of the physical data object is intact; and a second set of images of the physical data object in which the top layer of the physical object is removed. In other words, data object module 116 may receive a first set of images in which the numbers, letters, and/or symbols of the physical data object are not revealed and a second set of images in which the numbers, letters, and/or symbols of the physical data object are revealed.

At step 310, back-end computing system 104 may receive an indication of an outcome of the game. For example, the administrator may notify data object module 116 whether the user lost, won, or partially won a prize based on the numbers, letters, and/or symbols that were revealed.

At step 312, back-end computing system 104 may cause the user to participate in the game using the digital data object. For example, data object module 116 may be configured to generate a set of graphical objects with which the user may interact using user device 102. For example, data object module 116 may generate a first graphical object corresponding to an unscratched lottery ticket based on the first set of scanned images. Data object module 116 may prompt the user to interact with the first graphical object. In some embodiments, the user may virtually scratch off the top layer using their finger or stylus. In some embodiments, the user may actuate a digital button to cause removal of the top layer. Once removed, data object module 116 may update the user's interface with a second graphical object based on the second set of images. In this manner, data object module 116 may allow the user to participate in a scratch-off game in an online manner, which is traditionally not utilized by state-run lottery systems.

In some embodiments, depending on the amount won, back-end computing system 104 may either automatically credit a user's account with the winnings or prompt the user to navigate to a state-run lottery facility to pick up their winnings. For example, if the user's winnings are under a threshold amount, then back-end computing system 104 may automatically credit the user's account. If, for example, the user's winnings meet or exceed the threshold amount, the back-end computing system 104 may prompt the user to visit a state-lottery facility to retrieve their winnings.

FIGS. 5A-5D illustrate exemplary GUIs utilized by lottery personnel (e.g., administrator) for creating an electronic version of a physical scratch-off ticket.

Figure 5A:
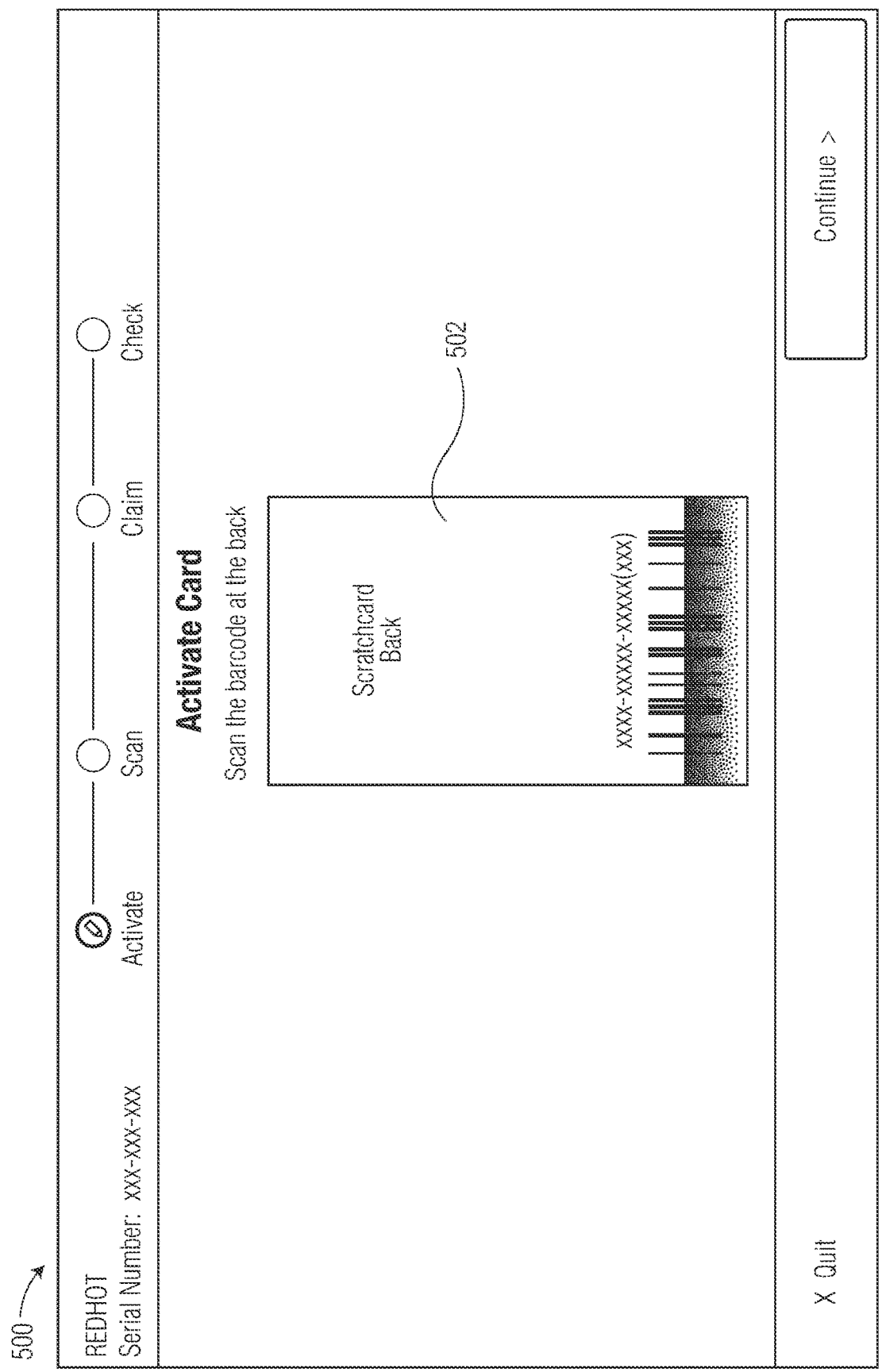
FIG. 5A illustrates an exemplary graphical user interface, according to example embodiments.

FIG. 5A illustrates an example graphical user interface (GUI) 500, according to example embodiments. GUI 500 may be presented to an administrator via one or more computing devices associated with back-end computing system 104.

As shown, GUI 500 may be representative of an activation screen for activating a physical data object, in response to receiving a request for a digital data object. GUI 500 may include a graphical element 502. Graphical element 502 may instruct an administrator to scan a barcode or QR code of the physical data object to activate the physical data object. By scanning the barcode or physical data object with scanning tool 124, the administrator may activate the physical data object (e.g., a physical scratch-off ticket of a pack of physical scratch-off tickets to be sold).

Figure 5B:
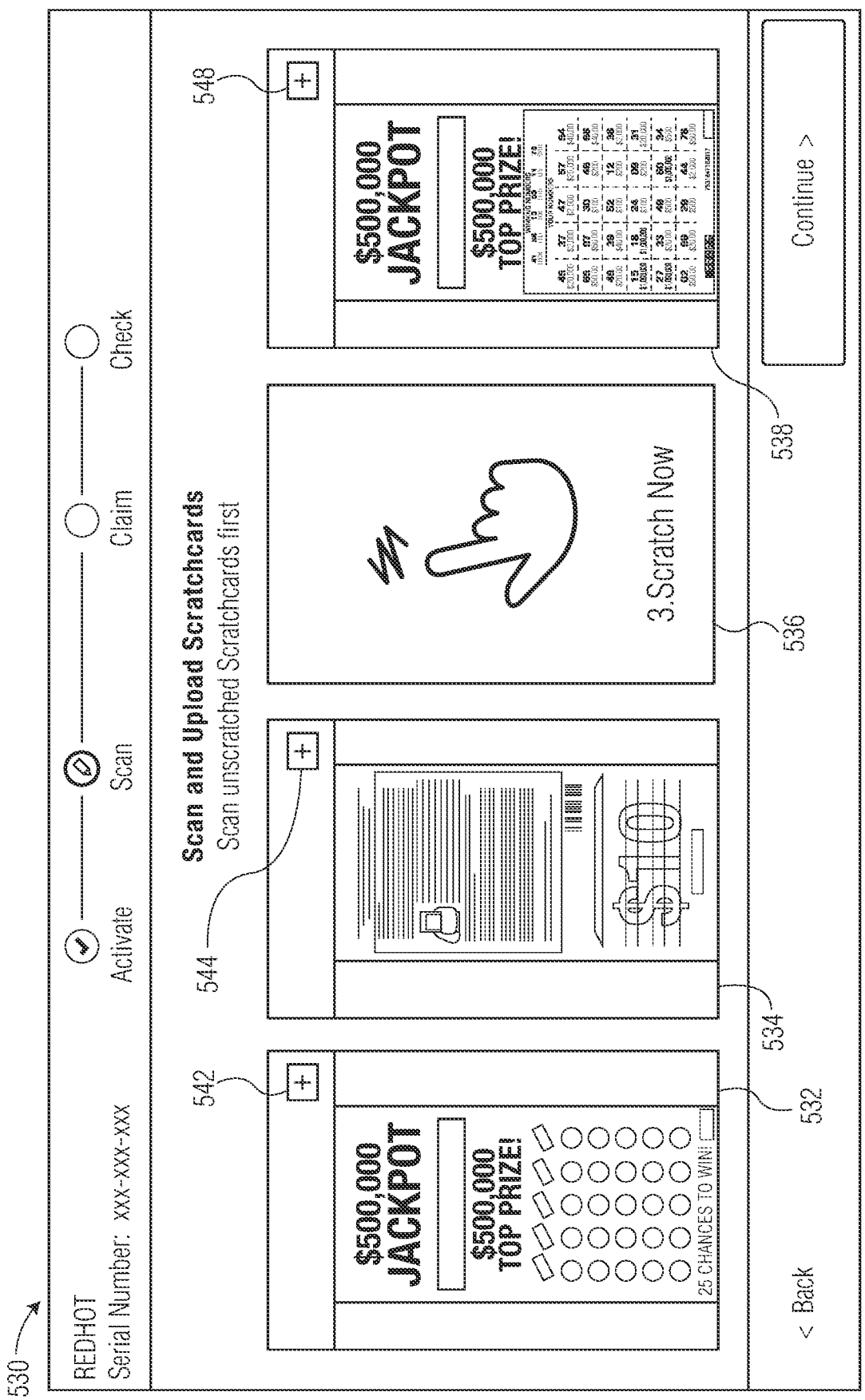
FIG. 5B illustrates an exemplary graphical user interface, according to example embodiments.

FIG. 5B illustrates an example graphical user interface (GUI) 530, according to example embodiments. GUI 530 may be presented to an administrator via one or more computing devices associated with back-end computing system 104.

As shown, following scanning of the barcode or physical data object with scanning tool 124, an administrator may be prompted to perform several scanning steps. As shown, GUI 530 may include a plurality of graphical elements 532, 534, 536, and 538.

Graphical element 532 may prompt the user to upload a scanned image of an unscratched front surface of the physical data object. For example, via graphical icon 542, a user may add a scanned image of the unscratched front surface of the physical data object.

Graphical element 534 may prompt the user to upload a scanned image of a back surface of the physical data object. For example, via graphical icon 544, a user may add a scanned image of the back surface of the physical data object.

Graphical element 536 may prompt the administrator to scratch or remove a coating or layer of the physical data object. For example, referring back to graphical element 532, as shown, a physical data object may include a layer that obfuscates one or more of letters, numbers, or symbols that may dictate whether a user has won a prize. Graphical element 536 may prompt the administrator to remove the layer following upload of the image of the unscratched front surface and back surface.

Graphical element 538 may prompt the user to upload a scanned image of the scratched front surface of the physical data object. As provided above, once the unscathed front surface of the physical data object is uploaded, the administrator is permitted to remove the layer on the physical data object to reveal one or more of letters, numbers, or symbols. As shown, via graphical icon 548, a user may add a scanned image of the scratched front surface of the physical data object.

FIG. 5C illustrates an example graphical user interface (GUI) 550, according to example embodiments. GUI 550 may be presented to an administrator via one or more computing devices associated with back-end computing system 104.

As shown, following uploading of the plurality of images of the physical data object, an administrator may be prompted to input the prize amount indicated by the physical data object.

As shown, GUI 550 may include a plurality of selectable prize options for the game type associated with the physical data object. When the administrator scans the physical data object with scanning tool 124, the administrator may be notified of the prize amount, if any, to be awarded to the user. Based on that amount conveyed to the administrator from computing system 106, the administrator may select one of the graphical elements displayed via GUI 550. For example, as shown, administrator may select graphical element 552 corresponding to a prize amount of $500.

Figure 5D:
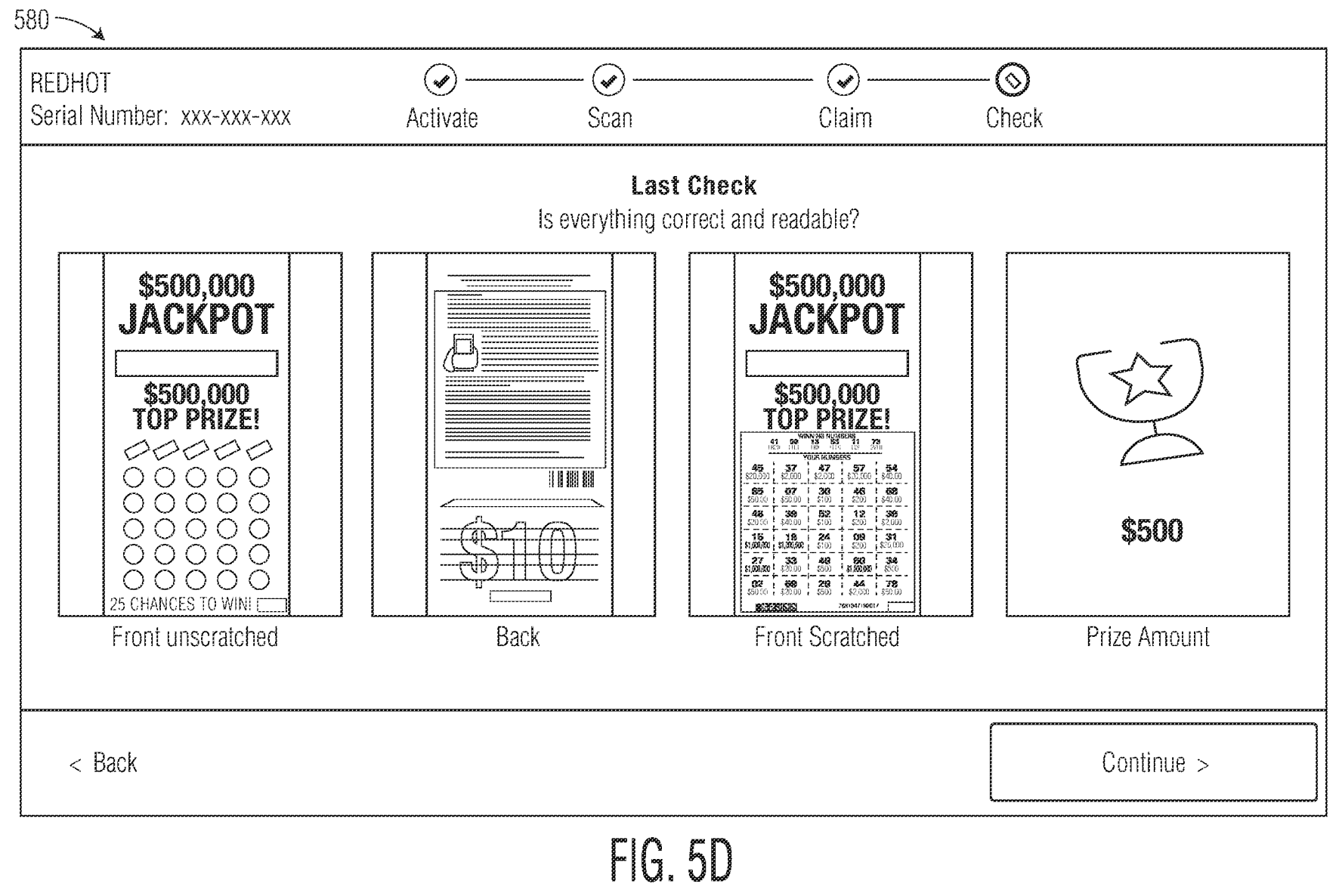

FIG. 5D illustrates an example graphical user interface (GUI) 580, according to example embodiments. GUI 580 may be presented to an administrator via one or more computing devices associated with back-end computing system 104.

As shown, following uploading of an indication of the prize amount, an administrator may be prompted to perform one final check of the data before the digital data object corresponding to the physical data object is conveyed to the user. For example, an administrator may be prompted to confirm that an image of the unscratched front surface, an image of the back surface, an image of the scratched front surface, and the prize amount are all indicated before completing the transaction. Once the administrator presses complete, data object module 116 may provide the digital data object corresponding to the physical data object to the user for participation.

Figure 6A:
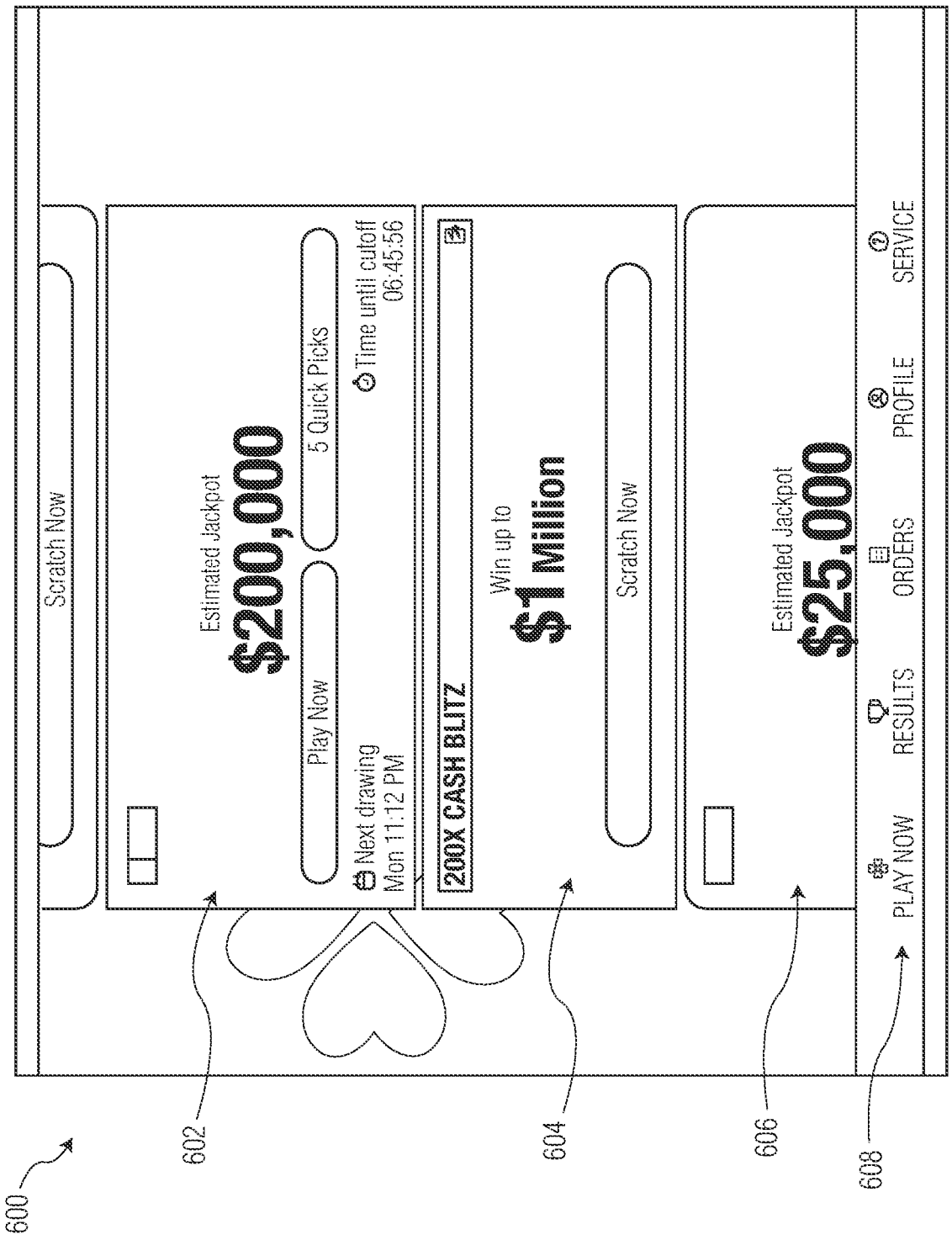
FIG. 6A illustrates an exemplary graphical user interface, according to example embodiments.

FIGS. 6A-6D illustrate exemplary GUIs utilized by end users (e.g., players) for remotely selecting and purchasing an electronic version of a scratch-off ticket, according to example embodiments FIG. 6A illustrates an exemplary GUI 600 implementing a first step in the selecting and purchasing process for allowing a player to select a specific lottery game, according to example embodiments. GUI 600 may be transmitted from back-end computing system 104 via network 105 and then presented to the player via application 112 running on user device 102. As shown, GUI 600 may be representative of various lottery games 602, 604 and 606 available for the player to select and play. GUI 600 may also include a menu 608 for providing options such as "play now" (e.g., play a game immediately), "results" (e.g., view past game results), "orders" (e.g., view current/past orders), "profile" (e.g., view/modify player profile) and "service" (e.g., ask for help) among others. The player selects one of the games (e.g., game 604) to play by clicking or tapping on the "Scratch Now" button. In this example, the player selects to play game 604.

Figure 6B:
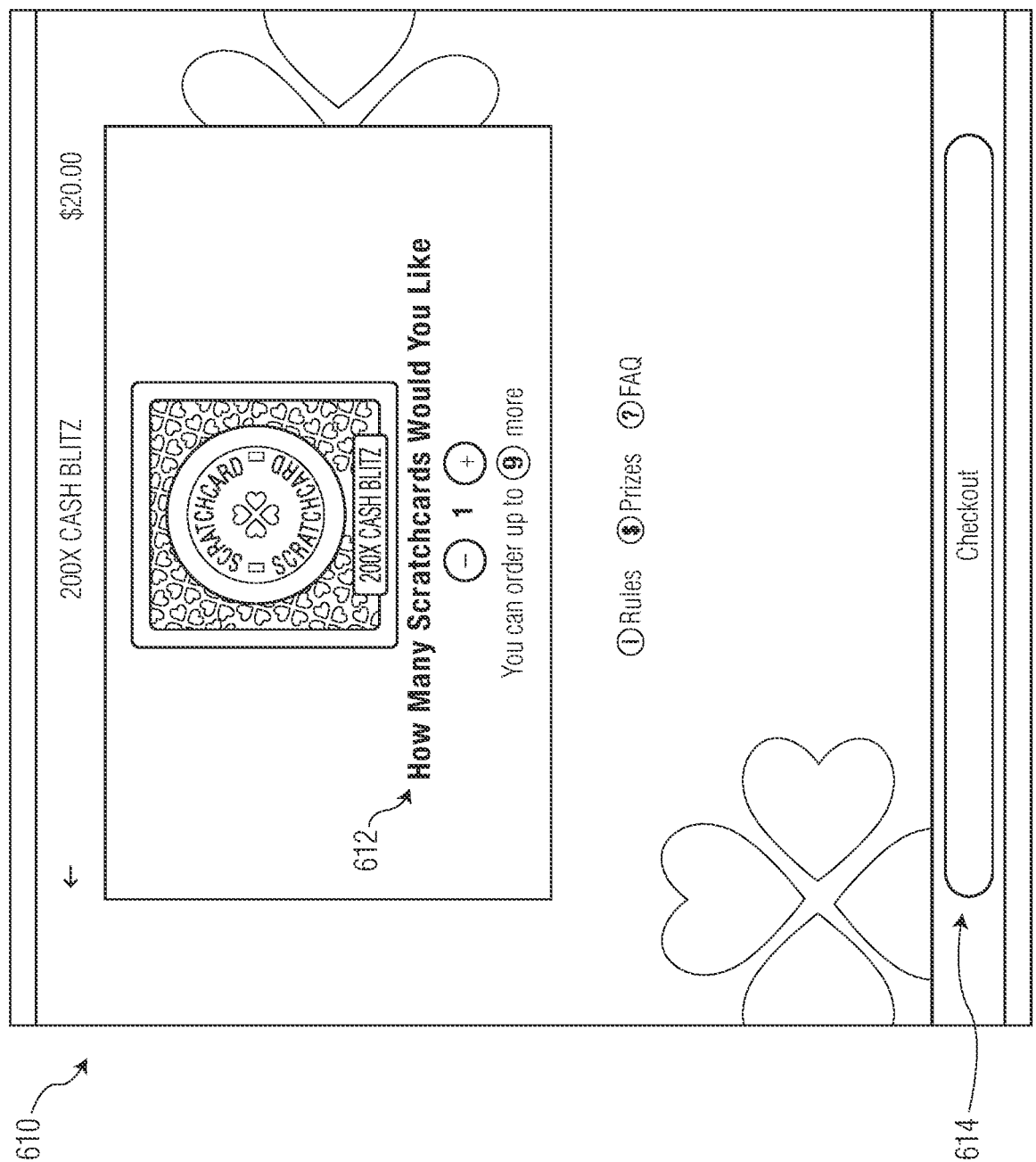
FIG. 6B illustrates an exemplary graphical user interface, according to example embodiments.

FIG. 6B illustrates an exemplary GUI 610 implementing a second step in the selecting and purchasing process for allowing the player to select a quantity of tickets for the selected game, according to example embodiments. GUI 610 may be transmitted from back-end computing system 104 via network 105 and then presented to the player via application 112 running on user device 102. As shown, GUI 610 may be representative of a quantity selector 612 for selecting a quantity of the game selected in FIG. 6A. The player may select a desired number of tickets that they wish to play at the listed ticket price. Once the selection is made, the player may select checkout button 614 to proceed.

Figure 6C:
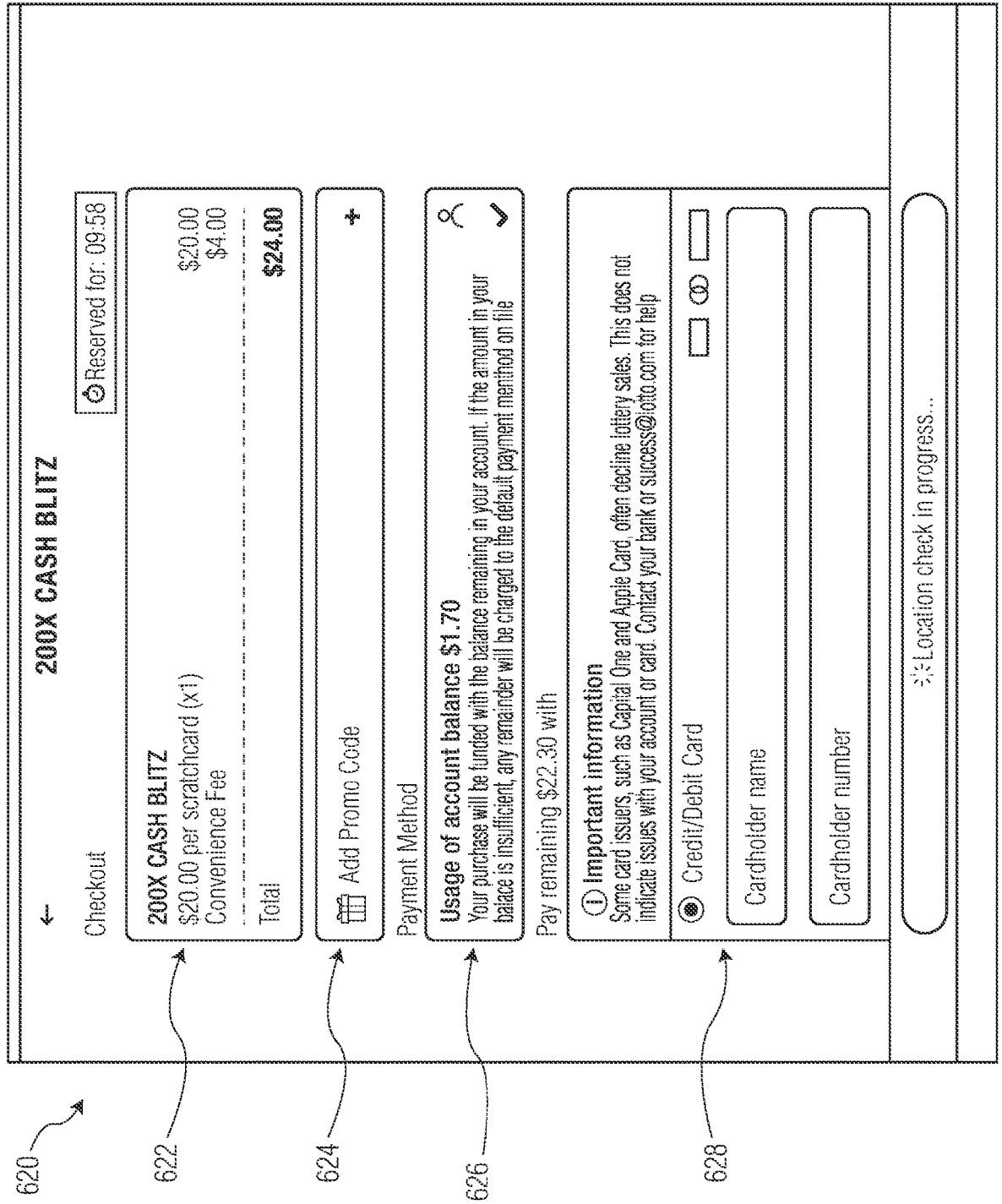
FIG. 6C illustrates an exemplary graphical user interface, according to example embodiments.

FIG. 6C illustrates an exemplary GUI 620 implementing a third step in the selecting and purchasing process for purchasing the selected number of tickets, according to example embodiments. GUI 620 may be transmitted from back-end computing system 104 via network 105 and then presented to the player via application 112 running on user device 102. As shown, GUI 620 may be representative of a check out screen that displays a total cost 622 of the selected tickets, an option 624 to enter a promotional code to receive promotional items such as discounts, a payment method selector 626, and a payment information portion 628. During this step, the player may confirm the total amount of the tickets, enter any promotional code, select their payment method, and enter their payment information before checking out. Of course, the payment method and payment information may be automatically populated by the back-end system based on information associated with the player's existing account.

Figure 6D:
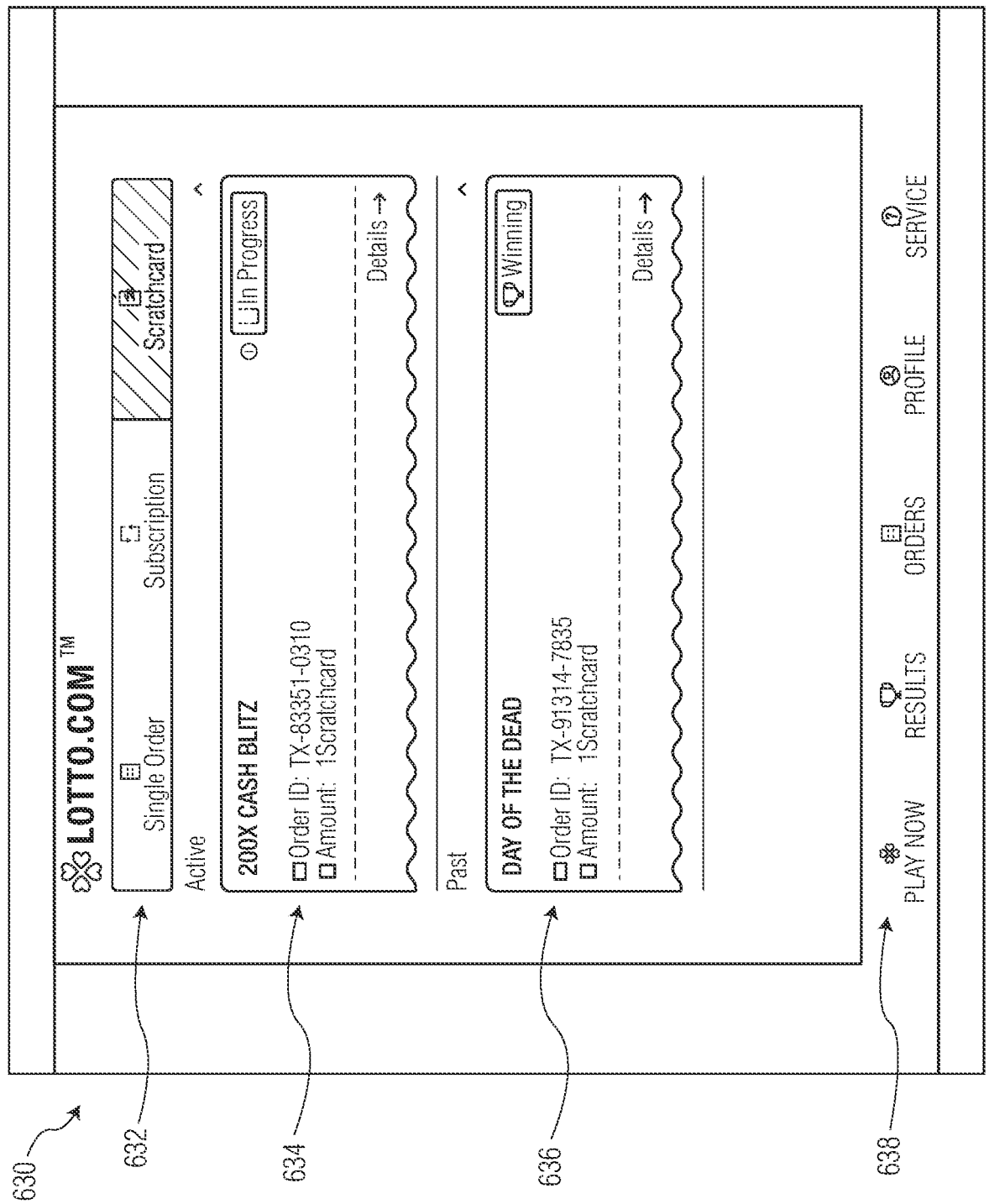
FIG. 6D illustrates an exemplary graphical user interface, according to example embodiments.

FIG. 6D illustrates an exemplary GUI 630 implementing a fourth step in the selecting and purchasing process for viewing current and past purchases, according to example embodiments. GUI 630 may be transmitted from back-end computing system 104 via network 105 and then presented to the player via application 112 running on user device 102. As shown, GUI 630 may be representative of present and past purchases associated with the players session or account. For example, menu 632 may include selections for single orders, subscriptions, and scratch card orders. Graphic 634 may show the currently active ticket purchases, while graphic 636 may show past ticket purchases and results. Various selectable menu options (previously described) may also be shown in menu 638.

Once the scratch-off ticket is selected and purchased as shown in FIGS. 6A-6D, the scratch-off ticket may be played by the player.

FIGS. 7A-7E illustrate exemplary GUIs utilized by the player for remotely scratching and exploring an electronic version of a scratch-off ticket herein referred to as digital data objects (i.e., graphical objects), according to example embodiments.

Figure 7A:
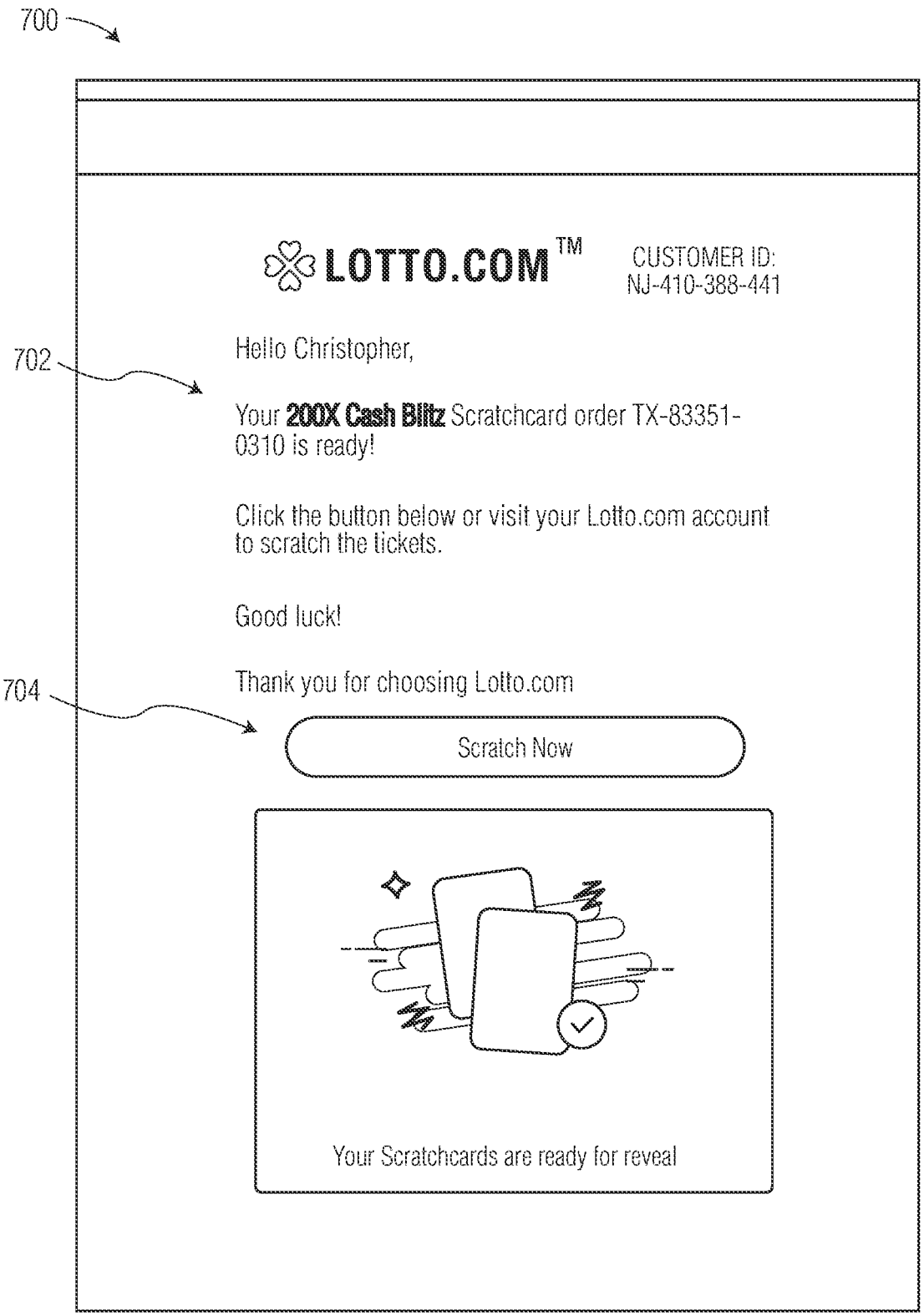
FIG. 7A illustrates an exemplary graphical user interface, according to example embodiments.

FIG. 7A illustrates an exemplary GUI 700 implementing a first step in virtual gaming process for presenting the available game to the player, according to example embodiments. GUI 700 may be transmitted from back-end computing system 104 via network 105 and then presented to the lottery play via application 112 running on user device 102. As shown, GUI 700 may be representative of a graphic that shows the player what games are purchased and available to play. For example, graphic 702 may greet the player and identify the purchased ticket available for game play. The player can begin playing the scratch-off ticket by selecting "Scratch Now" button 704.

Figure 7B:
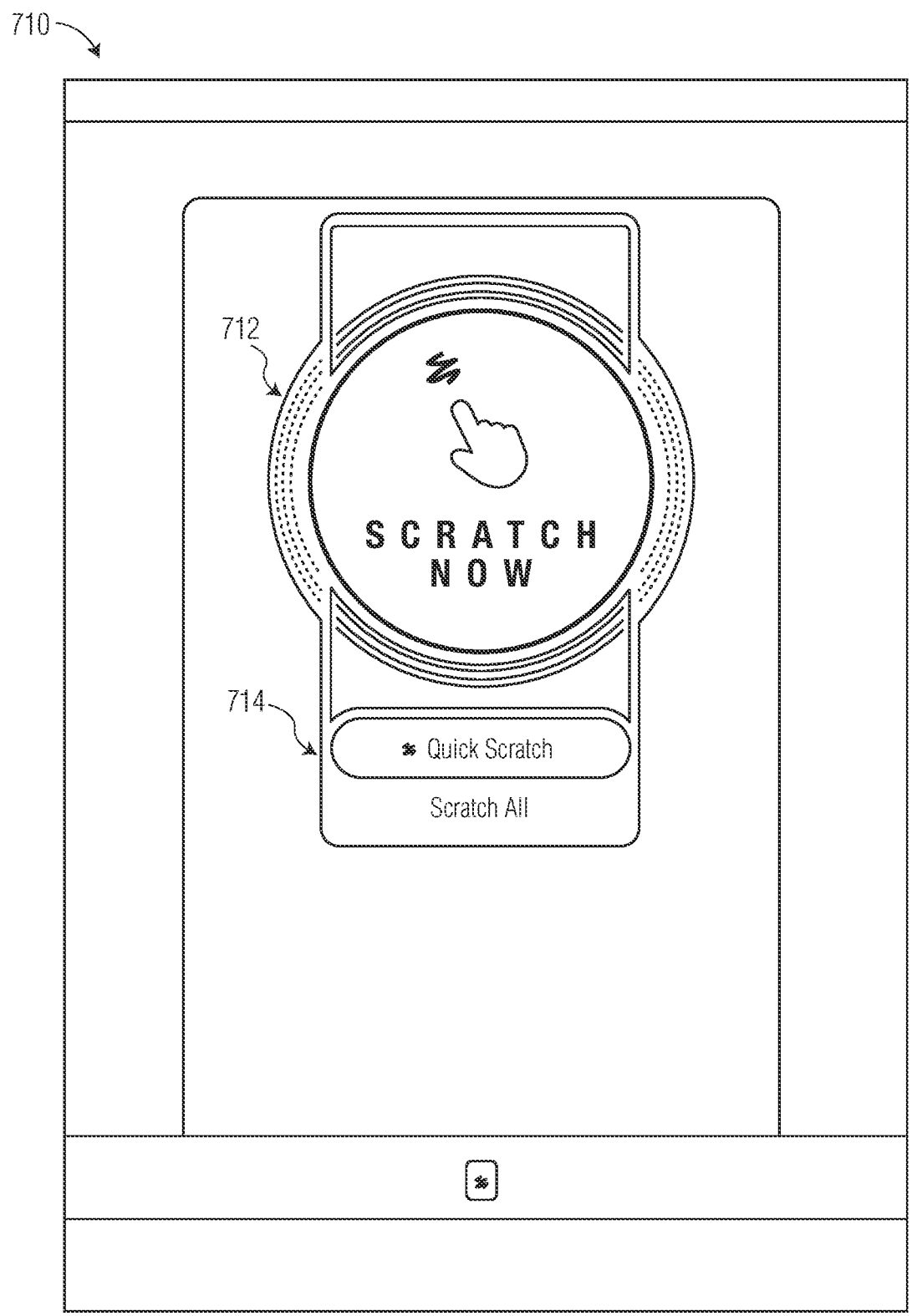
FIG. 7B illustrates an exemplary graphical user interface, according to example embodiments.

FIG. 7B illustrates an exemplary GUI 710 implementing a second step in virtual gaming process where the player can begin to virtually scratch the digital data object of the scratch-off ticket, according to example embodiments. GUI 710 may be transmitted from back-end computing system 104 via network 105 and then presented to the player via application 112 running on user device 102. As shown, GUI 710 may be representative of a graphic that allows the player to interact with and unveil the scratch-off ticket. For example, the graphic scratch region 712 may be a digital overlay that instructs the player to "Scratch Now" in a particular region of the screen. The digital overlay is essentially a graphic that is overlayed on top of the digital data object of the unveiled scratched ticket. Thus, when the user begins to scratch region 712, either with the computer mouse cursor or with their finger on a touch screen, the digital mask may be gradually removed thereby gradually exposing the digital data object of the scratched ticket beneath. Essentially, application 112 may remove the digital overlay in regions where the user begins to virtually scratch the graphic. Of course, if the player does not want to manually scratch the ticket with their finger or mouse, they can select the "Quick Scratch" button 714 at which point the entire digital overlay is removed automatically, thereby exposing the digital data object of the unveiled scratched ticket beneath.

Figure 7C:
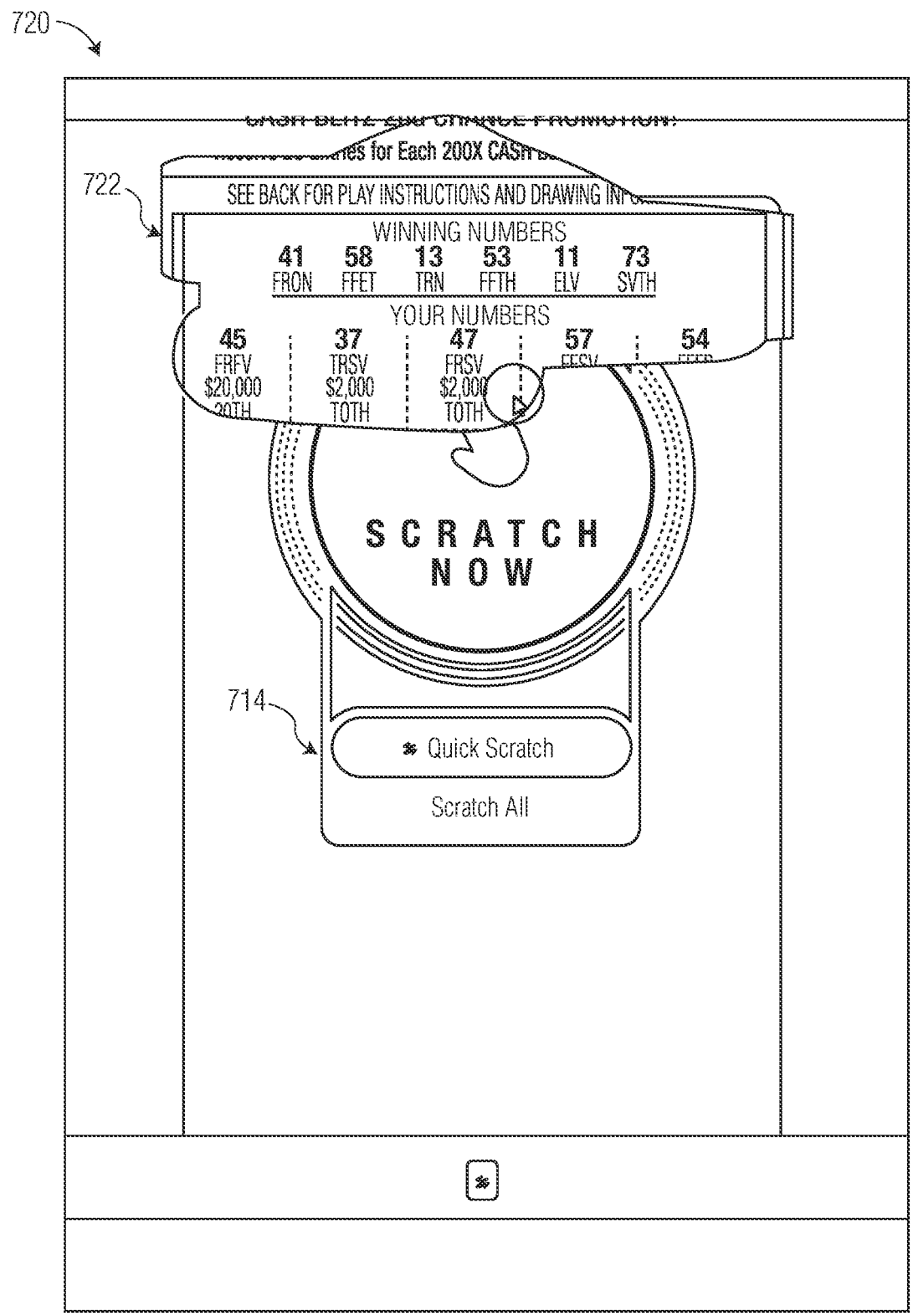
FIG. 7C illustrates an exemplary graphical user interface, according to example embodiments.

FIG. 7C illustrates an exemplary GUI 720 implementing a third step in virtual gaming process showing the virtual scratching of the ticket. GUI 720 may be transmitted from back-end computing system 104 via network 105 and then presented to the player via application 112 running on user device 102. As shown, GUI 720 may be representative of area 722 where the upper portion of the ticket has been virtually scratched exposing the upper portion of the digital data object of the unveiled scratched ticket beneath. In this example, the lower portion of the digital data object of the ticket has not been scratched and therefore is still hidden by the digital overlay.

It is noted that the digital data object of the scratch-off ticket transmitted from back-end computing system 104 via network 105 and then presented to the player via application 112 running on user device 102 may take many forms. In some examples, the back-end computing system 104 may transmit the digital data object of the unveiled scratch-off ticket separately from the digital overlay. In such examples, application 112 may place the digital overlay on top of the digital data object of the unveiled scratch-off ticket, and then remove the overlay as the ticket is virtually scratched. However, in other examples, the back-end computing system 104 may transmit the digital data object already integrated with the overlay such that the unveiled scratch-off ticket already obscured by the digital overlay at the time of reception. In such examples, application 112 may apply a known algorithm to remove the overlay as the ticket is virtually scratched. Such embodiments may be beneficial for ensuring the secrecy of the unveiled scratch-off ticket during transmission of the digital data object during stages prior to the virtual scratching. In other examples, the back-end computing system 104 may transmit only portions of the digital data object of the unveiled scratch-off ticket as virtual scratching is performed. In such examples, as the player virtually scratches the graphic, application 112 may retrieve the unscratched portion of the ticket from back-end computing system 104. This retrieval process is continued until the ticket is fully scratched. Such embodiments may be beneficial for ensuring the secrecy of the unveiled scratch-off ticket during transmission of the digital data object during stages prior to the virtual scratching.

Figure 7D:
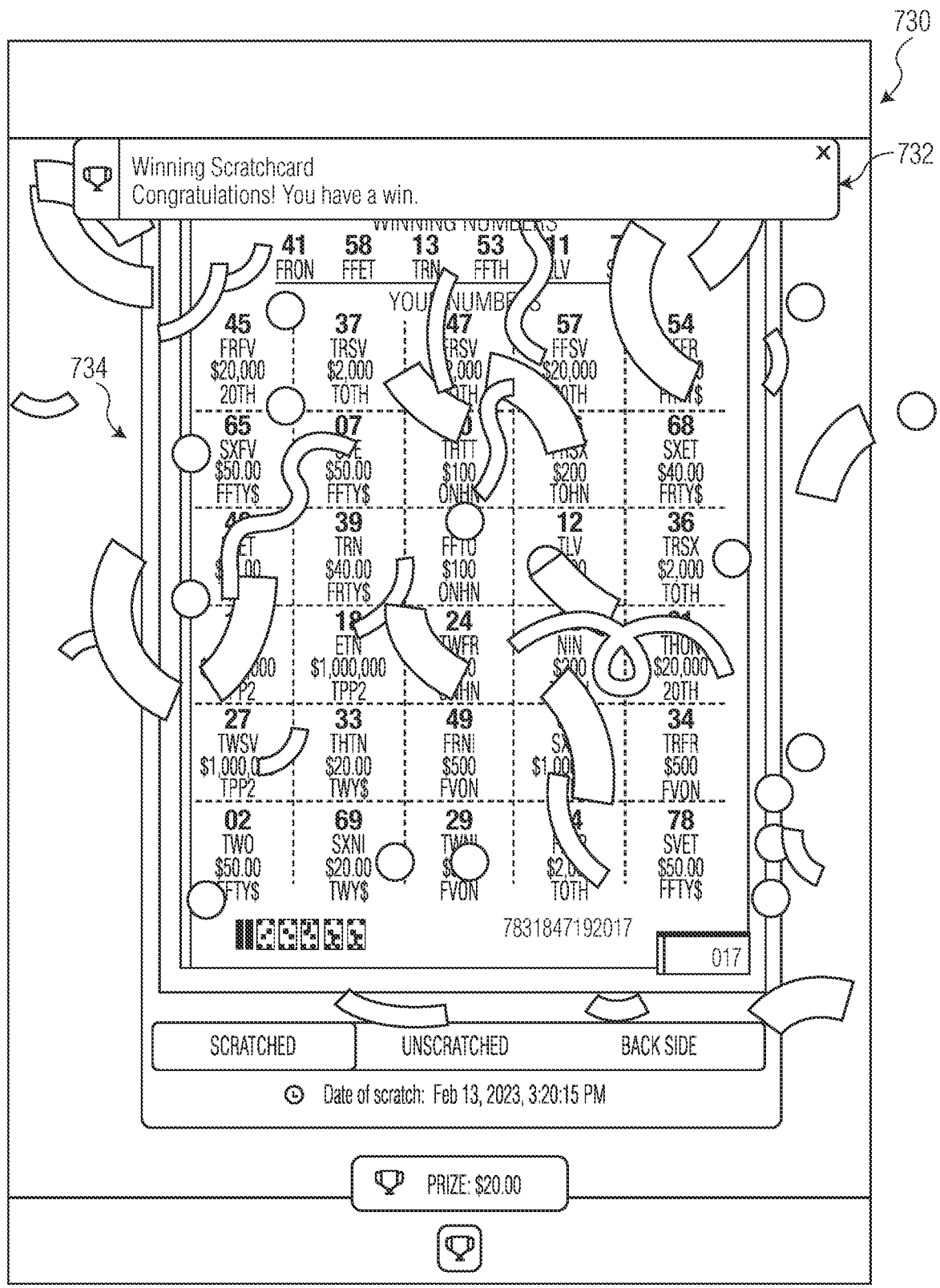
FIG. 7D illustrates an exemplary graphical user interface, according to example embodiments.

FIG. 7D illustrates an exemplary GUI 730 implementing a fourth step in virtual gaming process where the ticket is fully scratched, according to example embodiments. GUI 730 may be transmitted from back-end computing system 104 via network 105 and then presented to the player via application 112 running on user device 102. As shown, GUI 730 may be representative of graphics showing the winning/losing ticket. For example, graphic 732 may state that the ticket is a winner or loser, while graphic 734 may show the digital data object of the fully scratched ticket with appropriate animation (e.g., flying confetti if the ticket is a winner), an indication whether the prize is won or lost, and the prize amount. Of course, appropriate sounds may also be played by the application via the user device to indicate a winning or losing ticket.

Figure 7E:
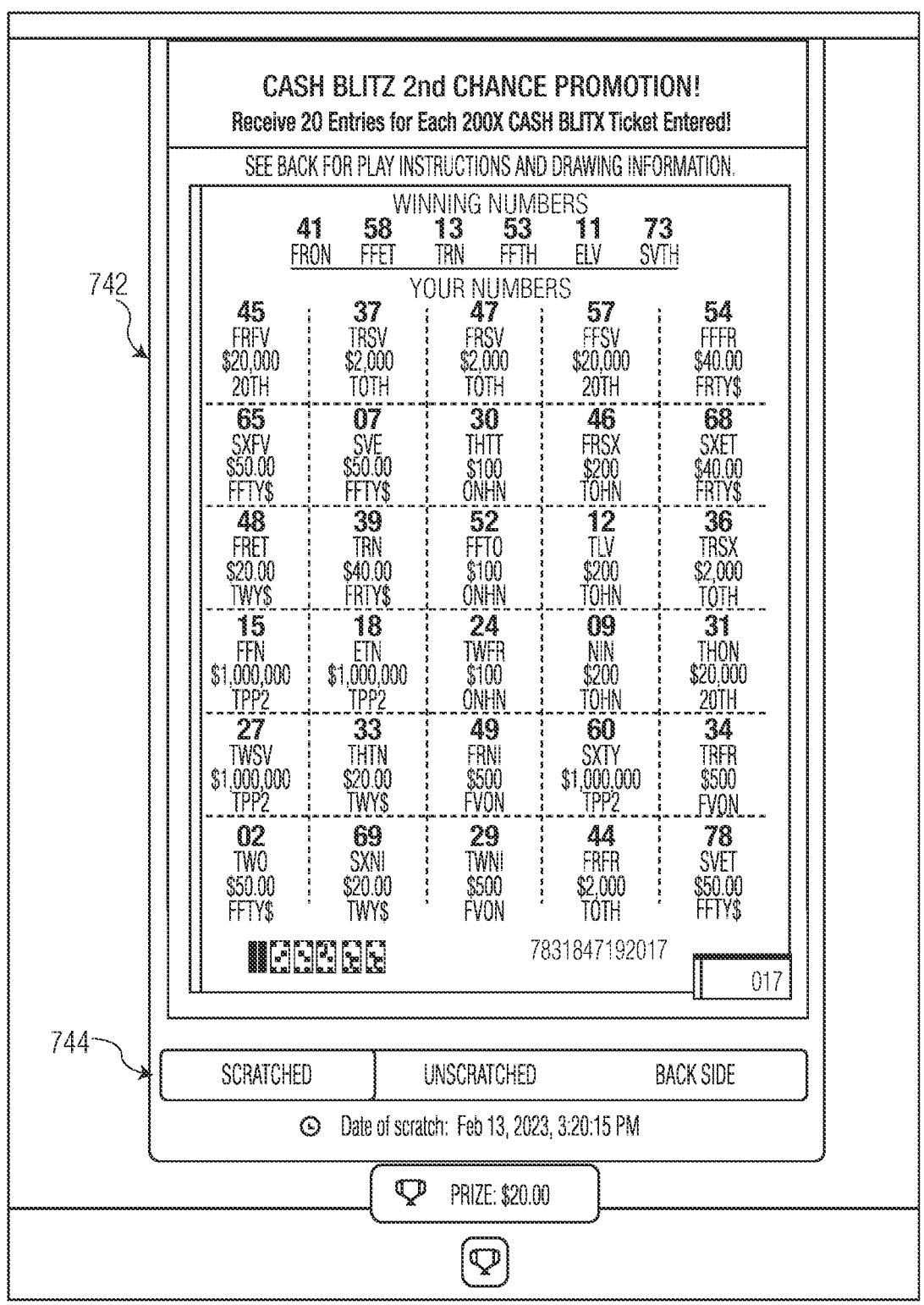
FIG. 7E illustrates an exemplary graphical user interface, according to example embodiments.

FIG. 7E illustrates an exemplary GUI 740 implementing a fifth step in virtual gaming process for exploring the views/states of the digital data object of the scratch-off ticket, according to example embodiments. GUI 740 may be transmitted from back-end computing system 104 via network 105 and then presented to the player via application 112 running on user device 102. As shown, GUI 740 may be representative of various views for exploring various portions of the digital data object of the scratch-off ticket. For example, graphic 742 may be a view of the scratch-off ticket when it is scratched as indicated by the selection of the "Scratched" button on menu 744. If the player selects the "Unscratched" button on menu 744, graphic 742 shows the digital data object of the unscratched ticket. Likewise, if the player selects the "Back Side" button on menu 744, graphic 742 shows the digital data object of the back side of the ticket. This allows the player to see both sides of ticket in both the scratched and unscratched states.

Figure 4A:
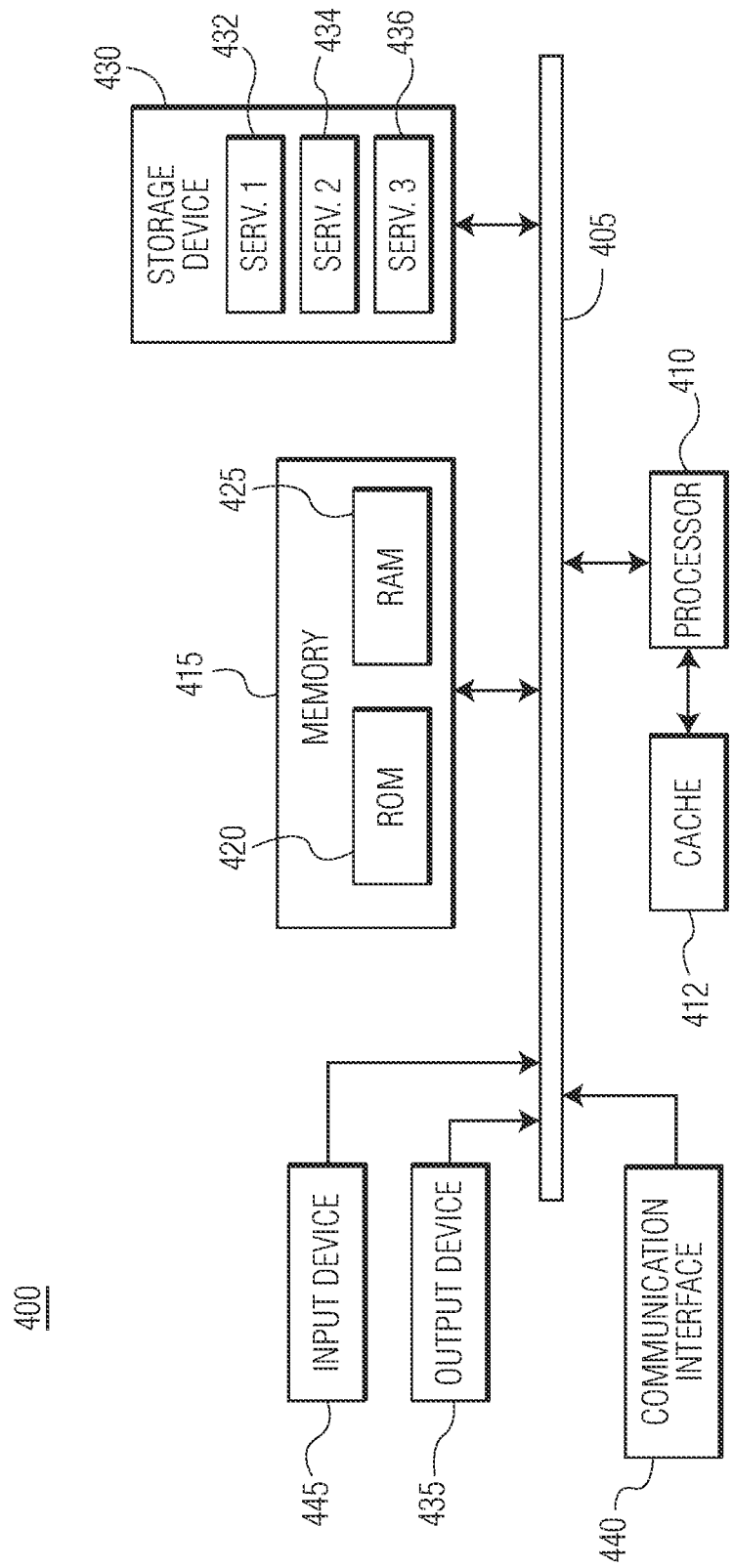
FIG. 4A illustrates a system bus computing system architecture, according to example embodiments.

FIG. 4A illustrates an architecture of system bus computing system 400, according to example embodiments. One or more components of system 400 may be in electrical communication with each other using a bus 405. System 400 may include a processor (e.g., one or more CPUs, GPUs or other types of processors) 410 and a system bus 405 that couples various system components including the system memory 415, such as read only memory (ROM) 420 and random access memory (RAM) 425, to processor 410. System 400 can include a cache of high-speed memory connected directly with, in close proximity to, or integrated as part of processor 410. System 400 can copy data from memory 415 and/or storage device 430 to cache 412 for quick access by processor 410. In this way, cache 412 may provide a performance boost that avoids processor 410 delays while waiting for data. These and other modules can control or be configured to control processor 410 to perform various actions. Other system memory 415 may be available for use as well. Memory 415 may include multiple different types of memory with different performance characteristics. Processor 410 may be representative of a single processor or multiple processors. Processor 410 can include one or more of a general purpose processor or a hardware module or software module, such as service 1 432, service 2 434, and service 4 436 stored in storage device 430, configured to control processor 410, as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the system 400, an input device 445 can be any number of input mechanisms, such as a microphone for speech, a touch-sensitive screen for gesture or graphical input, keyboard, mouse, motion input, speech and so forth. An output device 435 (e.g., a display) can also be one or more of a number of output mechanisms known to those of skill in the art. In some instances, multimodal systems can enable a user to provide multiple types of input to communicate with system 400. Communication interface 440 can generally govern and manage the user input and system output. There is no restriction on operating on any particular hardware arrangement and therefore the basic features here may easily be substituted for improved hardware or firmware arrangements as they are developed.

Storage device 430 may be a non-volatile memory and can be a hard disk or other type of non-transitory computer readable media that can store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 can include services 432, 434, and 436 for controlling the processor 410. Other hardware or software modules are contemplated. Storage device 430 can be connected to system bus 405. In one aspect, a hardware module that performs a particular function can include the software component stored in a computer-readable medium in connection with the necessary hardware components, such as processor 410, bus 405, output device 435 (e.g., a display), and so forth, to carry out the function.

Figure 4B:
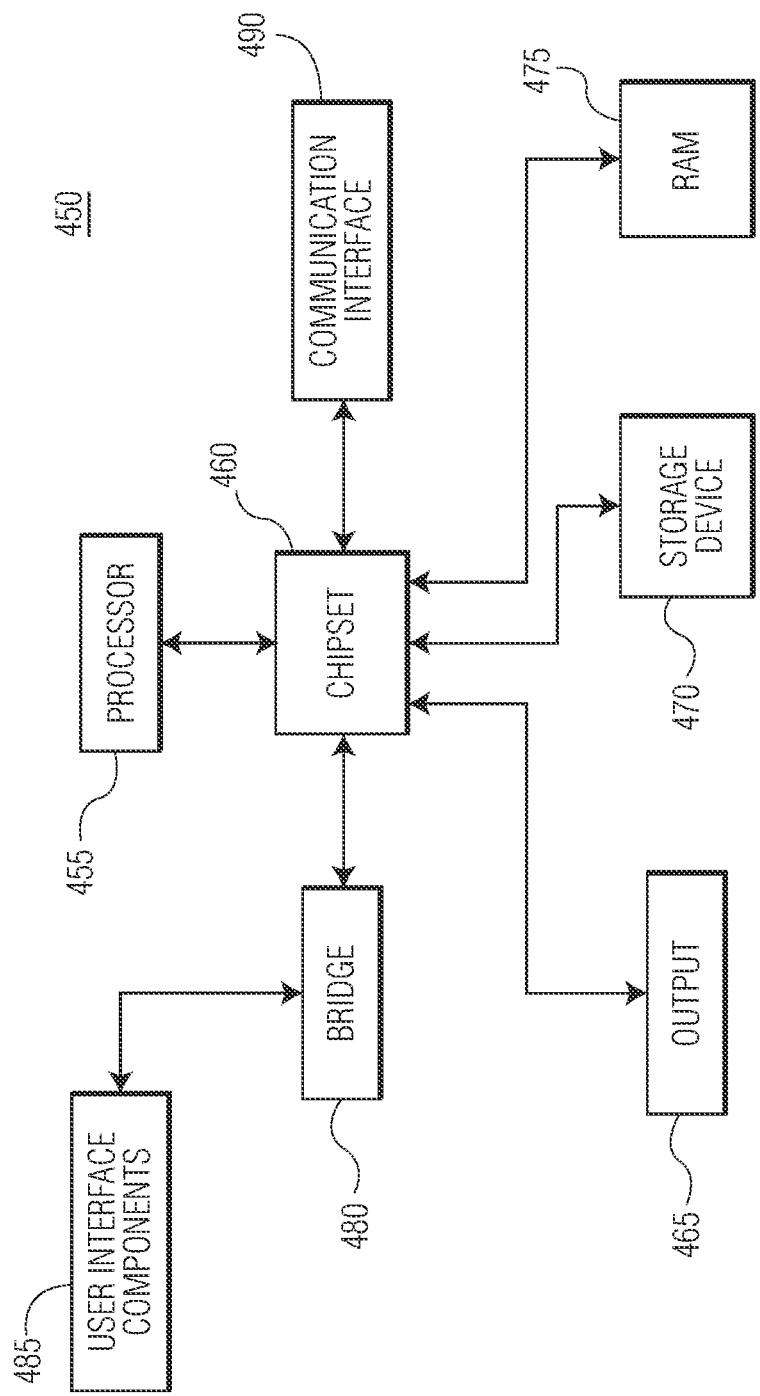
FIG. 4B illustrates a computer system having a chipset architecture, according to example embodiments.

FIG. 4B illustrates a computer system 450 having a chipset architecture, according to example embodiments. Computer system 450 may be an example of computer hardware, software, and firmware that can be used to implement the disclosed technology. System 450 can include one or more processors 455, representative of any number of physically and/or logically distinct resources capable of executing software, firmware, and hardware configured to perform identified computations. One or more processors 455 can communicate with a chipset 460 that can control input to and output from one or more processors 455. In this example, chipset 460 outputs information to output 465, such as a display, and can read and write information to storage device 470, which can include magnetic media, and solid-state media, for example. Chipset 460 can also read data from and write data to storage device 475 (e.g., RAM). A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 455 analyzing data stored in storage device 470 or 475. Further, the machine can receive inputs from a user through user interface components 485 and execute appropriate functions, such as browsing functions by interpreting these inputs using one or more processors 455.

It can be appreciated that example systems 400 and 450 can have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. Some embodiments described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
  receiving, by a computing system, a request to create a digital data object from a user device of a user for use in a game;
  generating, by the computing system, the digital data object based on the request;
  causing, by the computing system, a physical data object corresponding to the digital data object to be activated;
  receiving, by the computing system, a plurality of scanned images of the physical data object, the plurality of scanned images comprising a first set of scanned images of the physical data object in a first state and a second set of scanned images of the physical data object in a second state;
  receiving, by the computing system, an indication of an outcome of the game based on the physical data object;
  based on the indication and the plurality of scanned images, generating, by the computing system, a set of graphical objects to be displayed to the user via the user device of the user; and
  causing, by the computing system, the user to participate in the game using the set of graphical objects.

2. The method of claim 1, wherein receiving, by the computing system, the plurality of scanned images of the physical data object comprises:
  receiving the first set of scanned images, wherein, in the first state, the physical data object comprises a top layer obfuscating one or more of letters, numbers, or symbols; and
  receiving the second set of scanned images, wherein, in the second state, the physical data object does not comprise the top layer.

3. The method of claim 2, wherein based on the indication and the plurality of scanned images, generating, by the computing system, the set of graphical objects to be displayed to the user via the user device of the user comprises:
  generating a first graphical object corresponding to the first set of scanned images, wherein the first graphical object is a graphical representation of the physical data object in the first state.

4. The method of claim 3, wherein causing, by the computing system, the user to participate in the game using the set of graphical objects comprises:
  prompting the user to provide touch input to the first graphical object to digitally remove the top layer.

5. The method of claim 2, wherein based on the indication and the plurality of scanned images, generating, by the computing system, the set of graphical objects to be displayed to the user via the user device of the user comprises:
  generating a second graphical object corresponding to the second set of scanned images.

6. The method of claim 1, further comprising:
  determining, by the computing system, that the user has won at least a threshold amount based on the indication; and
  responsive to the determining, notifying, by the computing system, the user to visit a physical location to receive their prize.

7. The method of claim 1, further comprising:
  determining, by the computing system, that the user has won less than a threshold amount based on the indication; and
  responsive to the determining, automatically crediting, by the computing system, an account balance of the user.

8. A system, comprising:
  a processor; and
  a memory comprising one or more sequences of instructions, which, when executed by the processor, causes the system to perform operations comprising:
    receiving a request to create a digital data object from a user device of a user for use in a game;
    generating the digital data object based on the request;
    causing a physical data object corresponding to the digital data object to be activated;
    receiving a plurality of scanned images of the physical data object, the plurality of scanned images comprising a first set of scanned images of the physical data object in a first state and a second set of scanned images of the physical data object in a second state;
    receiving an indication of an outcome of the game based on the physical data object;
    based on the indication and the plurality of scanned images, generating a set of graphical objects to be displayed to the user via the user device of the user; and
    causing the user to participate in the game using the set of graphical objects.

9. The system of claim 8, wherein receiving the plurality of scanned images of the physical data object comprises:
   receiving the first set of scanned images, wherein, in the first state, the physical data object comprises a top layer obfuscating one or more of letters, numbers, or symbols; and
   receiving the second set of scanned images, wherein, in the second state, the physical data object does not comprise the top layer.

10. The system of claim 9, wherein based on the indication and the plurality of scanned images, generating the set of graphical objects to be displayed to the user via the user device of the user comprises:
   generating a first graphical object corresponding to the first set of scanned images, wherein the first graphical object is a graphical representation of the physical data object in the first state.

11. The system of claim 10, wherein causing the user to participate in the game using the set of graphical objects comprises:
   prompting the user to provide touch input to the first graphical object to digitally remove the top layer.

12. The system of claim 9, wherein based on the indication and the plurality of scanned images, generating the set of graphical objects to be displayed to the user via the user device of the user comprises:
   generating a second graphical object corresponding to the second set of scanned images.

13. The system of claim 8, further comprising:
   determining that the user has won at least a threshold amount based on the indication; and
   responsive to the determining, notifying the user to visit a physical location to receive their prize.

14. The system of claim 8, further comprising:
   determining that the user has won less than a threshold amount based on the indication; and
   responsive to the determining, automatically crediting an account balance of the user.

15. A method, comprising:
   transmitting, by a user device of a user, a request to a computing system for a physical data object for use in a game;
   receiving, by the user device, a digital data object virtually representing the physical data object based on the request, the digital data object comprising a scanned image of the physical data object obscured by a virtual top layer;
   receiving, by the user device, instructions from the user to remove the virtual top layer from the digital data object;
   removing, by the user device, the virtual top layer from the digital data object;
   displaying, by the user device, the digital data object without the virtual top layer revealing results of the game; and
   indicating, by the user device, a prize of the game based on the revealed game results.

16. The method of claim 15, further comprising:
   removing, by the user device, partial portions of the virtual top layer from the digital data object in response to the user virtually interacting with the digital data object, wherein the virtual interaction is initiated by a finger of the user or a cursor controlled by the user.

17. The method of claim 15, further comprising:
   removing, by the user device, an entire portion of the virtual top layer from the digital data object in response to the user selecting a quick reveal button.

18. The method of claim 15, further comprising:
   receiving, by the user device, as part of the digital data object, a scanned image of a frontside of the physical data object and a scanned image of a backside of the physical data object.

19. The method of claim 15, further comprising:
   digitally modifying, by the user device, the scanned image of the physical data object prior to the scanned image being received by the user device.

20. The method of claim 15, further comprising:
   pushing, by the user device, a notification to the user comprising the results of the game.

* * * * *